United States Patent
Kim

(10) Patent No.: US 12,536,727 B2
(45) Date of Patent: Jan. 27, 2026

(54) SPEECH IMAGE PROVIDING METHOD AND COMPUTING DEVICE FOR PERFORMING THE SAME

(71) Applicant: DEEPBRAIN AI INC., Seoul (KR)

(72) Inventor: Doo Hyun Kim, Gyeonggi-do (KR)

(73) Assignee: DEEPBRAIN AI INC., Seoul (KR)

( * ) Notice: Subject to any disclaimer, the term of this patent is extended or adjusted under 35 U.S.C. 154(b) by 975 days.

(21) Appl. No.: 17/764,718

(22) PCT Filed: Jul. 9, 2021

(86) PCT No.: PCT/KR2021/008825
§ 371 (c)(1),
(2) Date: Dec. 29, 2022

(87) PCT Pub. No.: WO2022/270669
PCT Pub. Date: Dec. 29, 2022

(65) Prior Publication Data
US 2024/0046540 A1 Feb. 8, 2024

(30) Foreign Application Priority Data
Jun. 25, 2021 (KR) .......... 10-2021-0083147

(51) Int. Cl.
*G06T 13/20* (2011.01)
*G06T 13/80* (2011.01)
*G10L 21/10* (2013.01)

(52) U.S. Cl.
CPC ............ *G06T 13/205* (2013.01); *G06T 13/80* (2013.01); *G10L 21/10* (2013.01)

(58) Field of Classification Search
None
See application file for complete search history.

(56) References Cited

U.S. PATENT DOCUMENTS

| 5,983,190 A * | 11/1999 | Trower, II ............. G06F 3/0481 704/275 |
| 2006/0009978 A1* | 1/2006 | Ma ......................... G06T 13/40 704/E21.02 |

(Continued)

FOREIGN PATENT DOCUMENTS

| JP | 2019-096114 A | 6/2019 |
| KR | 10-2000-0009490 A | 2/2000 |

(Continued)

OTHER PUBLICATIONS

Amir Jamaludin et al., "You Said That?: Synthesising Talking Faces from Audio", International Journal of Computer Vision (2019) 127, pp. 1767-1779, https://doi.org/10.1007/s11263-019-01150-y.

(Continued)

*Primary Examiner* — Anh-Tuan V Nguyen
(74) *Attorney, Agent, or Firm* — The PL Law Group, PLLC

(57) ABSTRACT

A computing device according to an embodiment disclosed includes one or more processors and a memory storing one or more programs executed by the one or more processors, and a standby state image generating module configured to generate a standby state image in which a person is in a standby state, an interpolation image generating module configured to generate an interpolation image set for interpolation between the standby state image and a pre-stored speech preparation image, and an image playback module configured to generate a connection image for connecting the standby state image and a speech state image based on the interpolation image set when the speech state image is generated.

10 Claims, 7 Drawing Sheets

(56) References Cited

U.S. PATENT DOCUMENTS

2010/0182325 A1* 7/2010 Cederwall ............... G06T 13/40
                                                           704/235
2019/0057533 A1* 2/2019 Habra ................... G06T 13/205
2021/0390945 A1* 12/2021 Zhang ..................... G10L 13/08
2022/0108510 A1* 4/2022 Sagar ...................... G10L 21/10

FOREIGN PATENT DOCUMENTS

KR    10-2008-0019842 A    3/2008
KR         10-1925440 B1   12/2018
KR    10-2020-0145701 A    12/2020
WO    WO 2017/094527 A1    6/2017

OTHER PUBLICATIONS

Seuc-Ho Ryu et al. "A study about a Production of A Game Character Animation Using a Combining with a Motion-capture System", The Journal of the Korea Contents Association, vol. 5, No. 5, 2005 (English translation of abstract is included in the first page.).

* cited by examiner

SPEECH IMAGE PROVIDING METHOD AND COMPUTING DEVICE FOR PERFORMING THE SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/008825, filed Jul. 9, 2021, which claims priority to the benefit of Korean Patent Application No. 10-2021-0083147 filed in the Korean Intellectual Property Office on Jun. 25, 2021, the entire contents of which are incorporated herein by reference.

BACKGROUND

1. Technical Field

Embodiments of the present disclosure relate to a technology for providing a speech image.

2. Background Art

With the recent technological development in the field of artificial intelligence, various types of content are being generated based on artificial intelligence (AI) technology. For example, there is a case in which, when there is a voice message to be transmitted, a speech image is generated as if a famous person (e.g., a president) speaks the voice message in order to draw people's attention. This is achieved by generating mouth shapes or the like to fit a specific message, just like a famous person speaking the specific message in an image of the famous person. In addition, technologies that allow artificial intelligence (AI) to conduct conversations with humans (e.g., video calls, or the like) are being studied. In the technologies, synthesizing the speech image takes time and requires a lot of data, and thus it is difficult to generate an image of a conversation (or an image of speech) in real time, which may be a problem.

SUMMARY

Embodiments of the present disclosure is to provide a new technology for providing an artificial intelligence-based speech image in real time.

According to an embodiment, a computing device including one or more processors and a memory storing one or more programs executed by the one or more processors includes: a standby state image generating module configured to generate a standby state image in which a person is in a standby state; an interpolation image generating module configured to generate an interpolation image set for interpolation between the standby state image and a pre-stored speech preparation image; and an image playback module configured to generate a connection image for connecting the standby state image and a speech state image based on the interpolation image set when the speech state image is generated.

A first frame of the speech state image may be provided to have continuity with a preset reference frame of the standby state image, and a last frame of the speech preparation image may be provided to have continuity with the first frame of the speech state image.

The interpolation image generating module may be further configured to generate an interpolation image set in a unit of a preset time period of the standby state image, and the number of frames of the unit of the time period may be set to be the same as the number of frames of the speech preparation image.

The interpolation image generating module may be further configured to generate interpolation image sets for interpolation between frames included in the time period of the standby state image and frames of the speech preparation image, respectively, and each of the interpolation image sets may be provided to have the same number of interpolation images as the number of frames of the speech preparation image.

The image playback module may be further configured to extract an interpolation image from each of the interpolation image sets and use the extracted interpolation image as a frame of the connection image.

The image playback module may be further configured to extract an interpolation image increasingly similar to the speech preparation image toward a last frame of the speech preparation image from a first frame thereof from the interpolation image sets and use the extracted interpolation image as frames of the connection image.

The number of the interpolation image sets may be n (n is a natural number), each of the interpolation image sets may include n interpolation images between the frame of the standby state image and the frame of the speech preparation image, and the image playback module may be further configured to extract a k-th interpolation image from a k (k=1 to n)-th interpolation image set and use the extracted k-th interpolation image as a frame of the connection image.

The image playback module may be further configured to play the connection image when the generation of the speech state image is completed while playing the standby state image, and play the speech state image after the connection image.

According to another embodiment, a computing device including one or more processors and a memory storing one or more programs executed by the one or more processors includes: a standby state image generating module configured to generate a standby state image in which a person is in a standby state; an interpolation image generating module configured to generate an interpolation image set for interpolation between the standby state image and a pre-stored speech preparation image; and an image playback module configured to transmit a source of speech content to a server, receive a speech state image in which a person is in a speech state from the server, and generate a connection image for connecting the standby state image and the speech state image based on the interpolation image set.

According to an embodiment, a speech image providing method performed by a computing device including one or more processors and a memory storing one or more programs executed by the one or more processors includes: generating a standby state image in which a person in the image is in a standby state; generating an interpolation image set for interpolation between the standby state image and a pre-stored speech preparation image; and generating a connection image for connecting the standby state image and a speech state image based on the interpolation image set when a speech state image is generated.

According to an embodiment, a speech image providing method performed by a computing device including one or more processors and a memory storing one or more programs executed by the one or more processors includes: generating a standby state image in which a person is in a standby state; generating an interpolation image set for interpolation between the standby state image and a pre-stored speech preparation image; transmitting a source of the speech content to a server; receiving a speech state image in which a person is in a speech state from the server; and generating a connection image for connecting the standby state image and the speech state image based on the interpolation image set.

According to the disclosed embodiments, an interpolation image set is prepared in advance for each time period of a standby state image, and a connection image is played based on the interpolation image set between the standby state image and a speech state image when a speech event occurs, thereby making it possible to provide conversation-related services based on artificial intelligence in real time.

In addition, from the interpolation image sets, an interpolation image is extracted that is increasingly similar to the speech preparation image toward the last frame of a speech preparation image from the first frame thereof, and the extracted interpolation image is used as a frame of a connection image, thereby making it possible to naturally connect the standby state image to the speech state image.

DETAILED DESCRIPTION

Hereinafter, specific embodiments of the present disclosure will be described with reference to the accompanying drawings. The following detailed description is provided to assist in a comprehensive understanding of the methods, devices and/or systems described herein. However, the detailed description is only for illustrative purposes and the present disclosure is not limited thereto.

In describing the embodiments of the present disclosure, when it is determined that detailed descriptions of known technology related to the present disclosure may unnecessarily obscure the gist of the present disclosure, the detailed descriptions thereof will be omitted. The terms used below are defined in consideration of functions in the present disclosure, but may be changed depending on the customary practice or the intention of a user or operator. Thus, the definitions should be determined based on the overall content of the present specification. The terms used herein are only for describing the embodiments of the present disclosure, and should not be construed as limitative. Unless expressly used otherwise, a singular form includes a plural form. In the present description, the terms "including", "comprising", "having", and the like are used to indicate certain characteristics, numbers, steps, operations, elements, and a portion or combination thereof, but should not be interpreted to preclude one or more other characteristics, numbers, steps, operations, elements, and a portion or combination thereof.

In the following description, the terminology "transmission", "communication", "reception" of a signal or information and terminology similar thereto may include a meaning in which the signal or information is directly transmitted from one element to another element and transmitted from one element to another element through an intervening element. In particular, "transmission" or "sending" of the signal or information to one element may indicate a final destination of the signal or information and may not imply a direct destination. The same is true for "reception" of the signal or information. In addition, in the present specification, a meaning in which two or more pieces of data or information are "related" indicates that when any one piece of data (or information) is obtained, at least a portion of other data (or information) may be obtained based thereon.

Further, it will be understood that, although the terms first, second, etc. may be used herein to describe various elements, these elements should not be limited by these terms. These terms may be used to distinguish one element from another element. For example, without departing from the scope of the present disclosure, a first element could be termed a second element, and similarly, a second element could be termed a first element.

Figure 1:
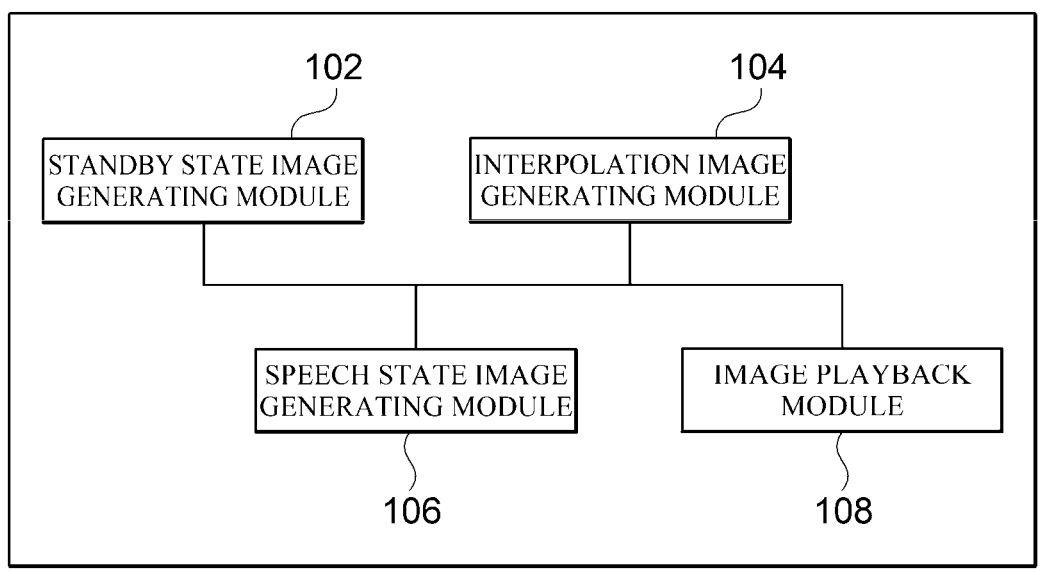
FIG. 1 is a block diagram illustrating a configuration of a speech image providing device according to an embodiment of the present disclosure.

FIG. 1 is a block diagram illustrating a configuration of a speech image providing device according to an embodiment of the present disclosure.

Referring to FIG. 1, the speech image providing device 100 may include a standby state image generating module 102, an interpolation image generating module 104, a speech state image generating module 106, and an image playback module 108.

In an embodiment, the standby state image generating module 102, the interpolation image generating module 104, the speech state image generating module 106, and the image playback module 108 may be implemented by using one or more physically separated devices, or may be implemented by one or more processors or a combination of one or more processors and software, and may not be clearly distinguished in specific operations, unlike the illustrated example.

In an exemplary embodiment, the speech image providing device 100 may be a device for performing a conversation (AI conversation), a video call (AI video call), or the like, using artificial intelligence, but is not limited thereto. The speech image providing device 100 may generate a speech image (e.g., a speech image for a conversation or video call) based on artificial intelligence, and may display the generated speech image on a screen or transmit it to the outside (e.g., a terminal of the conversation partner or a relay server that relays the terminal of the conversation partner and the speech image providing device 100).

For example, the speech image providing device 100 may be installed in a user terminal that wants to have a conversation with artificial intelligence, and may be installed in various devices or facilities such as an unmanned ordering kiosk, an electronic information desk, an outdoor advertising screen, a robot, or the like.

Here, the speech image is a synthesized image based on artificial intelligence, and is an image in which a predetermined person is speaking. The predetermined person may be a fictional person or a person widely known to the public (e.g., entertainer, sports player, president, or the like), but is not limited thereto.

The standby state image generating module 102 may generate an image in which a person in the image is in a standby state (hereinafter, may be referred to as a standby state image). Here, the standby state may be a state before the person in the image speaks (e.g., a state in which the person is listening to the other party or a state in which there is no speech before there is a conversation, or the like).

The standby state image generating module 102 may generate a standby state image having a preset playback time (e.g., 5 seconds, 30 seconds, or the like). The standby state image may be provided to express a natural motion while the person in the image is in the standby state. That is, the standby state image may be provided to naturally represent the facial expression, posture, and action (e.g., nodding, holding hands and listening, tilting the head, and smiling) of the person in the image while the person is listening to the other party.

The standby state image has a preset playback period and includes a plurality of frames. In addition, each frame of the standby state image may include a changed image in order to express a natural motion while the person in the image is in the standby state. In an exemplary embodiment, the standby state image may be provided to be returned from the last frame to the first frame again and repeatedly played, when being played from the first frame to the last frame.

The interpolation image generating module 104 may generate an interpolation image set for interpolation between the standby state image and a pre-stored speech preparation image. Here, the speech preparation image is an image used for natural connection between the standby state image and the speech state image to be described later. A detailed description thereof will be provided later.

The interpolation image generating module 104 may generate the interpolation image set in the unit of the preset time period of the standby state image. Here, the unit of the preset time period may be the same as a playback time of the speech preparation image. For example, the speech preparation image may be an image having a playback time of 0.5 seconds to 1 second, and the interpolation image generating module 104 may generate the interpolation image set in the unit of the time period of 0.5 seconds to 1 second from the standby state image.

Figure 2:
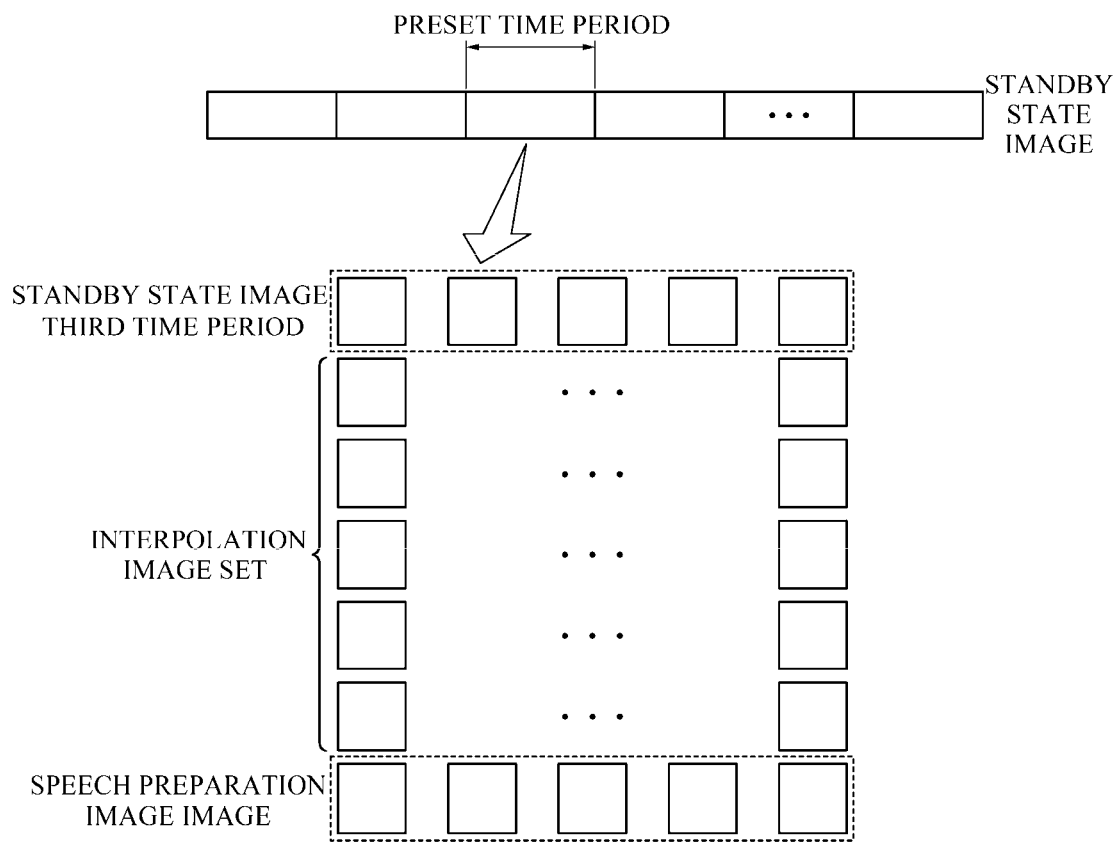
FIG. 2 is a diagram illustrating a state in which an interpolation image set is generated in an embodiment of the present disclosure.

FIG. 2 is a diagram illustrating a state in which an interpolation image set is generated in an embodiment of the present disclosure. Referring to FIG. 2, the interpolation image generating module 104 may generate each of interpolation images sets in a unit of a preset time period of the standby state image. Here, the generation of the interpolation image set for the third time period of the standby state image is illustrated as an example.

For convenience of description, the speech preparation image is illustrated as having five frames. In this case, the unit of the preset time period may be a unit of five frames. That is, each of the preset time periods of the standby state image may be divided to have the same number of frames as the speech preparation image.

The last frame of the speech preparation image may be provided to be naturally connected (that is, continuous) with the first frame of the speech state image to be described later. That is, the posture, motion, and mouth shape of the person in the last frame of the speech preparation image may be provided to be naturally connected (the same or as similar as possible) to the posture, motion, and mouth shape of the person in the first frame of the speech state image.

The interpolation image generating module 104 may generate interpolation image sets for interpolation between frames of the speech preparation image and corresponding frames included in each time period of the standby state image. Looking at the third time period of the standby state image, the interpolation image generating module 104 may generate a first interpolation image set for interpolation between a first frame of the third time period of the standby state image and a first frame of the speech preparation image. The interpolation image generating module 104 may generate a second interpolation image set for interpolation between a second frame of the third time period of the standby state image and a second frame of the speech preparation image.

In addition, the interpolation image generating module 104 may generate a third interpolation image set, a fourth interpolation image set, and a fifth interpolation image set for interpolation, respectively, for interpolation between a third frame of the third time period of the standby state image and a third frame of the speech preparation image, a fourth frame of the third time period of the standby state image and a fourth frame of the speech preparation image, and a fifth frame of the third time period of the standby state image and a fifth frame of the speech preparation image.

Here, the first interpolation image set to the fifth interpolation image set may be generated with the same number of frames as those of the speech preparation image (five in FIG. 2). The first interpolation image set to the fifth interpolation image set may be each generated while forming a series of sequences between the standby state image and the speech preparation image. In this case, the first interpolation image set to the fifth interpolation image set may be generated to be increasingly similar to the standby state image toward the standby state image, and may be generated to be increasingly similar to the speech preparation image toward the speech preparation image.

Referring back to FIG. 1, the speech state image generating module 106 may generate an image (hereinafter, referred to as a speech state image) in which a person in the image (a person having the same identity as the person in the standby state image) is in a speech state. Here, the speech state may refer to a state in which the person in the image is speaking (e.g., a state in which the person is speaking to the other party in a conversation, a video call, or the like).

The speech state image generating module 106 may generate a speech state image based on the source of input speech content. The source of speech content may be in the form of text, but is not limited thereto, and may be in the form of a voice.

The source of speech content may be generated through artificial intelligence by the speech image providing device 100 analyzing the speech of the other party, but is not limited thereto, and may be input from an external device (not shown) (e.g., a device that analyzes the speech of the other party and generates the source of speech content) or an administrator. Hereinafter, it will be described that the source of speech content is text as an example.

The speech state image generating module 106 may generate an audio part and an image part for a speech state image based on text of speech content (e.g., "Hello, I am AI tutor Danny"), and generate the speech state image by combining the generated audio part and the image part. The text-based audio and video generation technology is a known technology, and therefore a detailed description thereof will be omitted.

Figure 3:
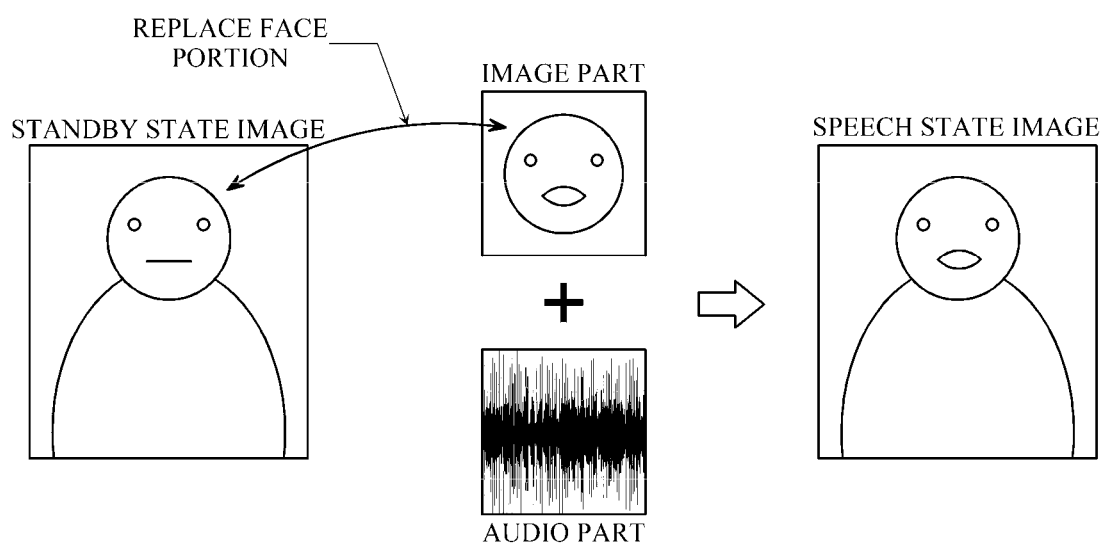
FIG. 3 is a diagram illustrating a state in which a speech state image is generated in an embodiment of the present disclosure.

When the speech state image generating module 106 generates an image part based on the text of speech content, the speech state image generating module 106 may generate the speech state image by generating an image part for the face portion of the person in the standby state image, and then changing only the face portion of the person in the standby state image (replacement of the face portion) as shown in FIG. 3. In this case, it is possible to reduce the data capacity while generating the speech state image more quickly.

The speech state image generating module 106 may generate the speech state image so that the first frame of the speech state image is continuous with a preset reference frame (e.g., the first frame of the standby state image) of the standby state image. In an exemplary embodiment, the first frame of the speech state image may be provided to be identical to the posture and motion of the person in the reference frame of the standby state image except for parts related to a person's speech (e.g., mouth, around the mouth, chin, and the like).

By generating the first frame of the speech state image and the speech image to have continuity with the reference frame of the standby state image, it is possible to play the speech state image following the standby state image even without considering other factors (e.g., the network environment between the speech image providing device 100 and the terminal of the other party), no matter when the speech state image is generated during playback of the standby state image.

The image playback module 108 may play the standby state image generated by the standby state image module 102. The image playback module 108 may play the standby state image and provide it to the conversation partner. In an exemplary embodiment, the image playback module 108 may play the standby state image and display it on a screen provided in the speech image providing device 100. In this case, the conversation partner may have a conversation with the person in the image while looking at the screen of the speech image providing device 100.

In addition, the image playback module 108 may play the standby state image and transmit it to an external device (e.g., a terminal of the conversation partner or a relay server). In this case, the conversation partner may receive the image through his/her terminal (e.g., smartphone, tablet PC, laptop computer, desktop PC, or the like), or an unmanned ordering kiosk, an electronic information desk, an outdoor advertising screen, or the like to have a conversation with the person in the image. The image playback module 108 may repeatedly play the standby state image until a speech event (a situation in which a conversation with the other party is started, a situation in which an answer to the other party's words is required, or the like) occurs.

When the speech state image is generated as the speech event occurs while the standby state image is being played, the image playback module 108 may switch the standby state image to the speech state image and play the speech state image. In this case, the image playback module 108 may generate and play a connection image based on the interpolation image set between the standby state image and the speech state image.

Figure 4:
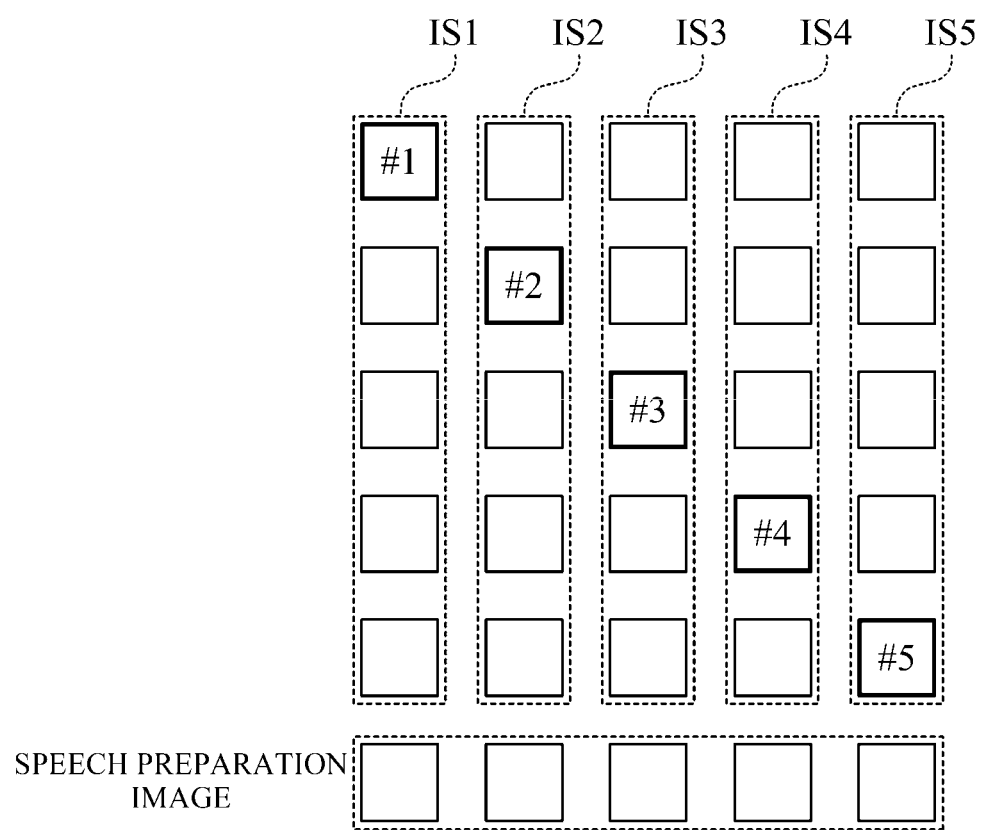
FIG. 4 is a diagram illustrating a state in which an image playback module generates and plays connection images between a standby state image and a speech state image in an embodiment of the present disclosure.

FIG. 4 is a diagram illustrating a state in which the image playback module 108 generates and plays a connection image between a standby state image and a speech state image in an embodiment of the present disclosure. Referring to FIG. 4, the image playback module 108 may identify a specific time period of the standby state image based on a point of time when generation of the speech state image is completed, and then extract interpolation image sets of the time period of the standby state image. In an exemplary embodiment, the image playback module 108 may extract interpolation image sets in a time period closest to the point of time when the generation of the speech state image is completed, in the standby state image.

That is, since for each time period of the standby state image, interpolation image sets for interpolation between frames within the time period of the corresponding standby state image and frames of the speech preparation image are generated as shown in FIG. 2, the image playback module 108 may extract interpolation image sets related to a time period of a specific standby state image based on the point of time when generation of the speech state image is completed.

In this case, the interpolation image sets may be generated in the same number as that of frames of the speech preparation image, and in FIG. 4, the number of interpolation image sets is five (that is, the number of frames of the speech preparation image is 5) is shown as an example. Each of a first interpolation image set IS1 to a fifth interpolation image set IS5 may include the same number of interpolation images as that of the frames of the speech preparation image.

The image playback module 108 may play a connection image between the standby state image and the speech state image based on the extracted interpolation image sets. The image playback module 108 may extract an interpolation image from each interpolation image set and use the extracted interpolation image as a frame of the connection image.

The image playback module 108 may extract, from the interpolation image sets, an interpolation image increasingly similar to the speech preparation image toward the last frame of the speech preparation image (or the standby state image) from the first frame thereof, and use the extracted interpolation image as a frame of the connection image. In other words, the image playback module 108 may extract, from the interpolation image sets, an interpolation image increasingly dissimilar to the standby state image toward the last frame from the first frame of the speech preparation image, and use the extracted interpolation image as a frame of the connection image.

Specifically, the image playback module 108 may extract a first interpolation image #1 (that is, an interpolation image most similar to the standby state image) from the first interpolation image set IS1, extract a second interpolation image #2 from the second interpolation image set IS2, extract a third interpolation image #3 from the third interpolation image set IS3, extract a fourth interpolation image #4 from the fourth interpolation image set IS4, and extract a fifth interpolation image #5 (that is, an interpolation image most similar to the speech preparation image) from the fifth interpolation image set IS5 and use extracted interpolation images as frames of the connection images.

That is, the number of interpolation image sets is n (that is, the number of the frames of the speech preparation image is n), and each interpolation image set includes n interpolation images between the frame of the standby state image and the frame of the speech preparation image, and n interpolation images are arranged with a series of sequences. In this case, the image playback module 108 may extract the k-th (k=1 to n) interpolation image from the k-th interpolation image set and use the extracted interpolation image as a frame of the connection image.

As described above, the connection image includes the first interpolation image #1 to the fifth interpolation image #5. The image playback module 108 may sequentially play the first interpolation image #1 to the fifth interpolation image #5. In this case, the first frame (that is, the first interpolation image) of the connection image is similar to the standby state image, but increasingly becomes similar to the speech preparation image toward the last frame (that is, the fifth interpolation image) of the connection image. Here, the last frame of the speech preparation image is provided to be continuous with the first frame of the speech state image, so that the speech state image may be naturally connected with the connection image.

Figure 5:
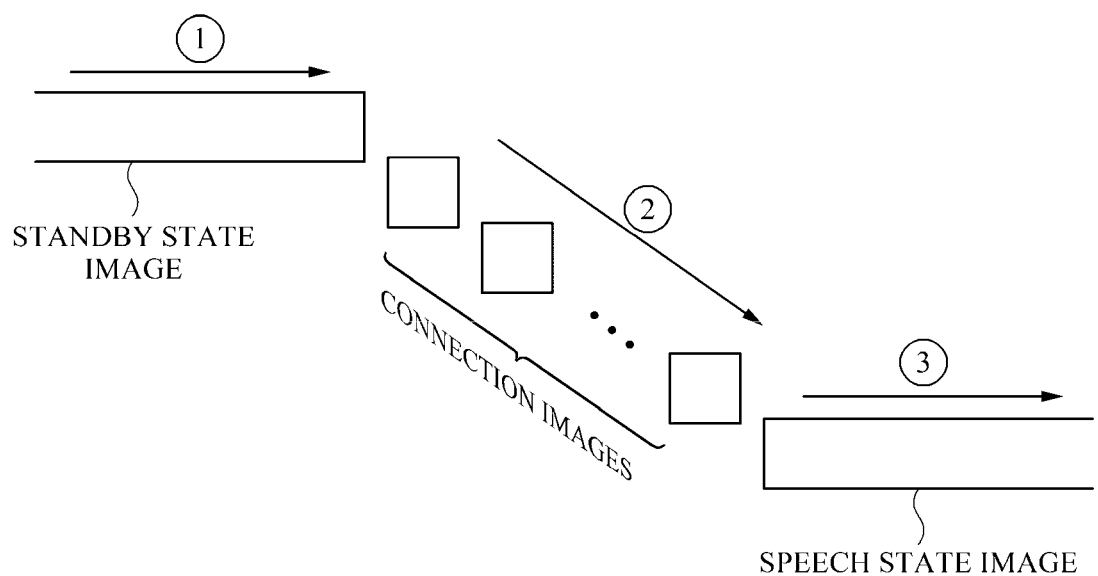
FIG. 5 is a diagram schematically illustrating a process in which an image playback module plays respective images in an embodiment of the present disclosure.

FIG. 5 is a diagram schematically illustrating a process in which an image playback module plays respective images in an embodiment of the present disclosure. Referring to FIG. 5, the image playback module 108 plays the standby state image (①), and plays the connection image generated based on interpolation image sets when generation of the speech state image is completed (②), and then, plays the speech state image (③). In this case, the standby state image and the speech state image are naturally connected through the connection image.

According to the disclosed embodiments, an interpolation image set is prepared in advance for each time period of a standby state image, and a connection image is played based on the interpolation image set between the standby state image and a speech state image when a speech event occurs, thereby making it possible to provide conversation-related services based on artificial intelligence in real time.

In addition, from the interpolation image sets, an interpolation image is extracted that is increasingly similar to the speech preparation image toward the last frame of a speech preparation image from the first frame thereof, and the extracted interpolation image is used as a frame of a connection image, thereby making it possible to naturally connect the standby state image to the speech state image.

In the present specification, a module may mean a functional and structural combination of hardware for carrying out the technical idea of the present disclosure and software for driving the hardware. For example, the "module" may mean a logical unit of a predetermined code and a hardware resource for executing the predetermined code, and does not necessarily mean physically connected code or a single type of hardware.

Figure 6:
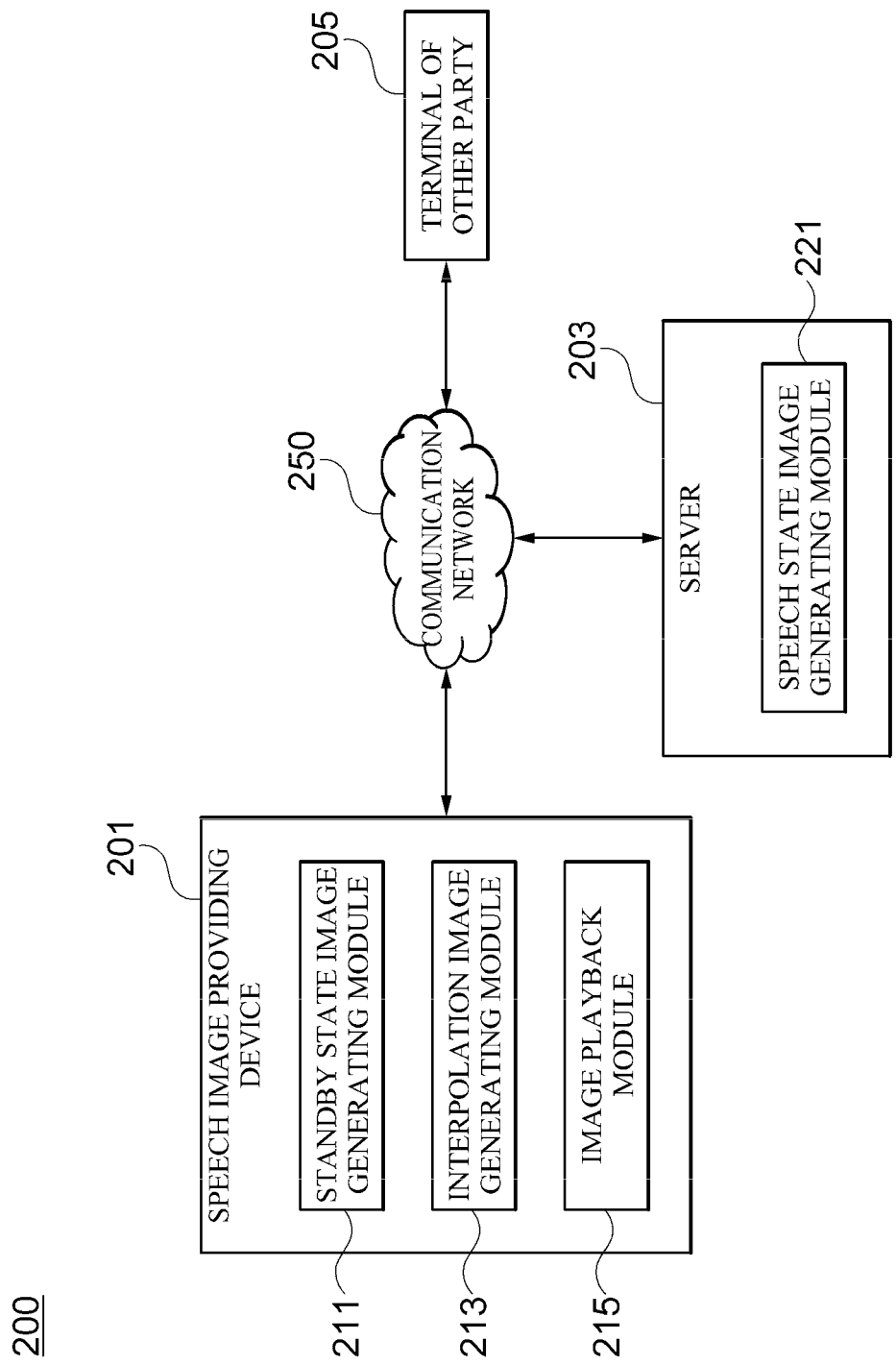
FIG. 6 is a block diagram illustrating a configuration of a speech image providing system according to an embodiment of the present disclosure.

FIG. 6 is a block diagram illustrating a configuration of a speech image providing system according to an embodiment of the present disclosure.

Referring to FIG. 6, a speech image providing system 200 may include a speech image providing device 201, a server 203, and a terminal 205 of the other party. The speech image providing device 201 may be communicatively connected to the server 203 and the terminal 205 of the other part through a communication network 250.

In some embodiments, the communication network 250 may include the Internet, one or more local area networks, wide area networks, cellular networks, mobile networks, other types of networks, or a combination of the above networks.

The speech image providing device 201 may include a standby state image generating module 211, an interpolation image generating module 213, and an image playback module 215. Here, the standby state image generating module 211 and the interpolation image generating module 213 is the same as the standby state image generating module 102 and the interpolation image generating module 104 shown in FIG. 1, and thus a detailed description thereof will be omitted.

When a source of speech content is input, the image playback module 215 may transmit the source of speech content to the server 203. The server 203 may generate a speech state image based on the source of speech content.

That is, the server 203 may include a speech state image generating module 221. In an exemplary embodiment, the server 203 may generate a speech state image (that is, an audio part and an image part) from the source of speech content based on machine learning technology. The server 203 may transmit the generated speech state image to the image playback module 215.

The image playback module 215 may play the standby state image and provide it to the terminal 205 of the other party. When a preset time amount of speech state image is received from the server 203 during playback of the standby state image, the image playback module 215 may play the connection image based on the interpolation image sets, and then play the speech state image and provide it to the terminal 205 of the other party.

Figure 7:
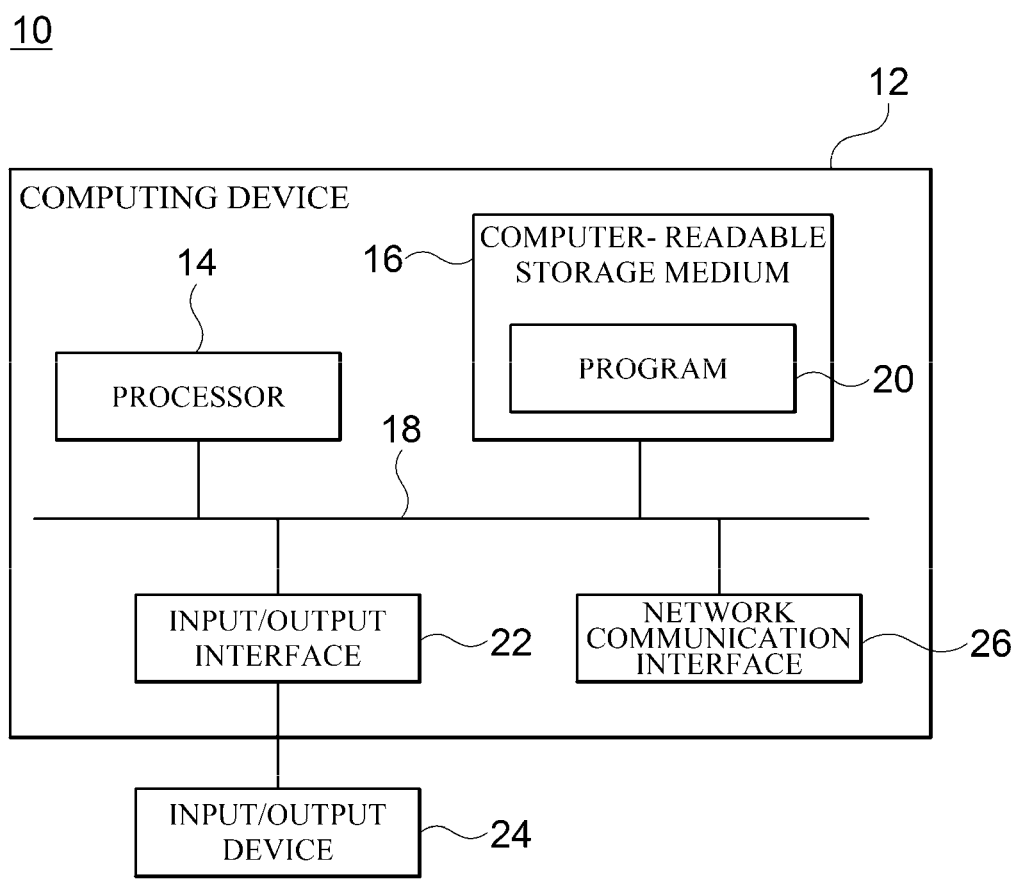
FIG. 7 is a block diagram exemplarily illustrating a computing environment that includes a computing device suitable for use in exemplary embodiments.

FIG. 7 is a block diagram exemplarily illustrating a computing environment 10 that includes a computing device suitable for use in exemplary embodiments. In the illustrated embodiment, each component may have different functions and capabilities in addition to those described below, and additional components may be included in addition to those described below.

The illustrated computing environment 10 includes a computing device 12. In an embodiment, the computing device 12 may be the speech image providing device 100.

The computing device 12 includes at least one processor 14, a computer-readable storage medium 16, and a communication bus 18. The processor 14 may cause the computing device 12 to operate according to the above-described exemplary embodiments. For example, the processor 14 may execute one or more programs stored in the computer-readable storage medium 16. The one or more programs may include one or more computer-executable instructions, which may be configured to cause, when executed by the processor 14, the computing device 12 to perform operations according to the exemplary embodiments.

The computer-readable storage medium 16 is configured to store computer-executable instructions or program codes, program data, and/or other suitable forms of information. A program 20 stored in the computer-readable storage medium 16 includes a set of instructions executable by the processor 14. In an embodiment, the computer-readable storage medium 16 may be a memory (a volatile memory such as a random-access memory, a non-volatile memory, or any suitable combination thereof), one or more magnetic disk storage devices, optical disc storage devices, flash memory devices, other types of storage media that are accessible by the computing device 12 and may store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 via the input/output interface 22. The exemplary input/output device 24 may include a pointing device (a mouse, a trackpad, or the like), a keyboard, a touch input device (a touch pad, a touch screen, or the like), a voice or sound input device, input devices such as various types of sensor devices and/or imaging devices, and/or output devices such as a display device, a printer, an interlocutor, and/or a network card. The exemplary input/output device 24 may be included inside the computing device 12 as a component constituting the computing device 12, or may be connected to the computing device 12 as a separate device distinct from the computing device 12.

Although the representative embodiments of the present disclosure have been described in detail as above, those skilled in the art will understand that various modifications may be made thereto without departing from the scope of the present disclosure. Therefore, the scope of rights of the present disclosure should not be limited to the described embodiments, but should be defined not only by the claims set forth below but also by equivalents of the claims.

What is claimed is:

1. A computing device comprising:
one or more processors; and
a memory storing one or more programs executed by the one or more processors;
a standby state image generating module configured to generate a standby state image in which a person is in a standby state;
an interpolation image generating module configured to generate an interpolation image set for interpolation between the standby state image and a pre-stored speech preparation image; and
an image playback module configured to generate a connection image for connecting the standby state image and a speech state image based on the interpolation image set when the speech state image is generated,
wherein the interpolation image generating module is further configured to generate the interpolation image set in a unit of a preset time period of the standby state image, and
the number of frames of the unit of the preset time period is set to be the same as the number of frames of the speech preparation image.

2. The computing device of claim 1, wherein a first frame of the speech state image is provided to have continuity with a preset reference frame of the standby state image; and
a last frame of the speech preparation image is provided to have continuity with the first frame of the speech state image.

3. The computing device of claim 1, wherein the interpolation image generating module is further configured to generate interpolation image sets for interpolation between frames included in the preset time period of the standby state image and frames of the speech preparation image, respectively; and
each of the interpolation image sets is provided to have the same number of interpolation images as the number of frames of the speech preparation image.

4. The computing device of claim 3, wherein the image playback module is further configured to extract an interpolation image from each of the interpolation image sets and use the extracted interpolation image as a frame of the connection image.

5. The computing device of claim 3, wherein the image playback module is further configured to extract an interpolation image increasingly similar to the speech preparation image toward a last frame of the speech preparation image from a first frame thereof from the interpolation image sets and use the extracted interpolation image as a frame of the connection image.

6. The computing device of claim 3, wherein the number of the interpolation image sets is n, where n is a natural number;
each of the interpolation image sets includes n interpolation images between the frame of the standby state image and the frame of the speech preparation image; and
the image playback module is further configured to extract a k-th interpolation image from a k (k=1 to n)-th interpolation image set and use the extracted k-th interpolation image as a frame of the connection image.

7. The computing device of claim 6, wherein the image playback module is further configured to play the connection image when the generation of the speech state image is completed while playing the standby state image, and play the speech state image after the connection image.

8. A computing device comprising:
one or more processors; and
a memory storing one or more programs executed by the one or more processors;
a standby state image generating module configured to generate a standby state image in which a person is in a standby state;
an interpolation image generating module configured to generate an interpolation image set for interpolation between the standby state image and a pre-stored speech preparation image; and
an image playback module configured to transmit a source of speech content to a server, receive a speech state image in which a person is in a speech state from the server, and generate a connection image for connecting the standby state image and the speech state image based on the interpolation image set,
wherein the interpolation image generating module is further configured to generate the interpolation image set in a unit of a preset time period of the standby state image, and
the number of frames of the unit of the preset time period is set to be the same as the number of frames of the speech preparation image.

9. A method for providing speech image, the method performed by a computing device including one or more processors and a memory storing one or more programs executed by the one or more processors, the method comprising:
generating a standby state image in which a person is in a standby state;
generating an interpolation image set for interpolation between the standby state image and a pre-stored speech preparation image; and
generating a connection image for connecting the standby state image and a speech state image based on the interpolation image set when the speech state image is generated,
wherein the generating the interpolation image set comprises generating the interpolation image set in a unit of a preset time period of the standby state image, and
the number of frames of the unit of the preset time period is set to be the same as the number of frames of the speech preparation image.

10. A method for providing speech image, the method performed by a computing device including one or more processors and a memory storing one or more programs executed by the one or more processors, the method comprising:
generating a standby state image in which a person is in a standby state;
generating an interpolation image set for interpolation between the standby state image and a pre-stored speech preparation image;

transmitting a source of the speech content to a server;
receiving a speech state image in which a person is in a speech state from the server; and
generating a connection image for connecting the standby state image and the speech state image based on the interpolation image set,
wherein the generating the interpolation image set comprises generating the interpolation image set in a unit of a preset time period of the standby state image, and
the number of frames of the unit of the preset time period is set to be the same as the number of frames of the speech preparation image.

* * * * *